(12) United States Patent
Niskanen et al.

(10) Patent No.: US 10,257,418 B2
(45) Date of Patent: Apr. 9, 2019

(54) IMAGE PROCESSING METHOD FOR MOVEMENT DETECTION AND COMPENSATION

(71) Applicant: VISIDON OY, Oulu (FI)

(72) Inventors: Matti Niskanen, Oulu (FI); Markus Turtinen, Ii (FI)

(73) Assignee: VISIDON OY, Oulu (FI)

( * ) Notice: Subject to any disclaimer, the term of this patent is extended or adjusted under 35 U.S.C. 154(b) by 0 days.

(21) Appl. No.: 15/545,374

(22) PCT Filed: Jan. 18, 2016

(86) PCT No.: PCT/FI2016/050019
§ 371 (c)(1),
(2) Date: Jul. 21, 2017

(87) PCT Pub. No.: WO2016/116666
PCT Pub. Date: Jul. 28, 2016

(65) Prior Publication Data
US 2017/0374285 A1   Dec. 28, 2017

(30) Foreign Application Priority Data

Jan. 23, 2015   (GB) .................................. 1501132.3

(51) Int. Cl.
*H04N 5/232*   (2006.01)
*G06T 5/00*   (2006.01)
*G06T 5/50*   (2006.01)

(52) U.S. Cl.
CPC ......... *H04N 5/23254* (2013.01); *G06T 5/003* (2013.01); *G06T 5/50* (2013.01);
(Continued)

(58) Field of Classification Search
CPC ........... H04N 5/23254; H04N 5/23277; H04N 5/232; H04N 5/23229; H04N 5/235;
(Continued)

(56) References Cited

U.S. PATENT DOCUMENTS 7,844,134 B2 * 11/2010 Sasaki ................ H04N 5/23248
348/222.1
8,350,922 B2 *  1/2013 D'Angelo ............ H04N 5/2329
348/222.1
(Continued)

FOREIGN PATENT DOCUMENTS

EP         2003876 A2   12/2008
EP         2544445 A1    1/2013
(Continued)

OTHER PUBLICATIONS

Mar. 17, 2015 combined Exam and Search Report issued in Great Britain Patent Application No. GB1501132.3.
(Continued)

*Primary Examiner* — Luong T Nguyen
(74) *Attorney, Agent, or Firm* — Oliff PLC

(57) ABSTRACT

An image processing method for improving image quality selects one of a plurality of two-dimensional pixel matrix source images of an imaged target as a reference image. Movement of the target is detected in the source images. The detected movement between the reference image and at least one other image of the source images is compensated differently in at least two different sections of the at least one other source image. The reference image and the movement compensated at least one other image are combined for forming an improved image.

10 Claims, 3 Drawing Sheets

(52) U.S. Cl.
CPC .............. *H04N 5/23277* (2013.01); *G06T 2207/20201* (2013.01); *G06T 2207/20221* (2013.01)

(58) Field of Classification Search
CPC .... G06T 3/00; G06T 5/50; G06T 7/00; G06T 7/001; G06T 5/003; G06T 2207/20201; G06T 2207/20221
See application file for complete search history.

(56) References Cited

U.S. PATENT DOCUMENTS

| | | | |
|---|---|---|---|
| 9,055,217 B2 * | 6/2015 | Naito | H04N 5/23229 |
| 2007/0120997 A1 | 5/2007 | Sasaki et al. | |
| 2007/0147706 A1 | 6/2007 | Sasaki et al. | |
| 2009/0285301 A1 * | 11/2009 | Kurata | H04N 19/51 375/240.16 |
| 2010/0053346 A1 * | 3/2010 | Mitsunaga | H04N 5/23248 348/208.6 |
| 2011/0267514 A1 | 11/2011 | D'Angelo et al. | |
| 2012/0269444 A1 * | 10/2012 | Naito | H04N 5/23229 382/197 |
| 2012/0307084 A1 | 12/2012 | Mantzel et al. | |
| 2012/0328025 A1 | 12/2012 | Chang et al. | |
| 2014/0071299 A1 | 3/2014 | Grundmann et al. | |
| 2014/0153840 A1 | 6/2014 | Chiao et al. | |
| 2014/0218569 A1 | 8/2014 | Tsubaki | |
| 2014/0267801 A1 | 9/2014 | Grundmann et al. | |
| 2014/0362240 A1 | 12/2014 | Klivington et al. | |

FOREIGN PATENT DOCUMENTS

| | | |
|---|---|---|
| EP | 2747416 A2 | 6/2014 |
| JP | 2009-089037 A | 4/2009 |

OTHER PUBLICATIONS

Apr. 28, 2016 Written Opinion of the International Searching Authority issued in Patent Application No. PCT/FI2016/050019.
Apr. 28, 2016 International Search Report issued in Patent Application No. PCT/FI2016/050019.
Patti, Andrew J. et al., "Superresolution Video Reconstruction with Arbitrary Sampling Lattices and Nonzero Aperture Time.", IEEE Trans on Image Processing, vol. 6, No. 8, pp. 1064-1076, (1997).
Feb. 3, 2017 English Translation of the International Preliminary Report on Patentability issued in Patent Application No. PCT/FI2016/050019.

* cited by examiner

IMAGE PROCESSING METHOD FOR MOVEMENT DETECTION AND COMPENSATION

FIELD

The invention relates generally to an image processing method.

BACKGROUND

Mobile phones and digital cameras typically have a rolling shutter which scans over the scene which is capture in the image. During scanning the camera may move, objects in the image may move or the whole scene/target may move. If more than one photo is captured of the same target in order to improve the image quality by combining the images, the movement between the scene and the camera may be different in different photos which decreases or eliminates the possibility of improvement. Additionally, the movement may not necessarily be linear which further complicates the situation. For example, if the upper and lower parts of two images match together but at the same time the middle part has a shift even only by one pixel, the images cannot be combined without a substantial reduction in quality. Thus, there is a need for improvement in image processing.

BRIEF DESCRIPTION

An object of the present invention is to provide an improved image processing method and an improved apparatus using the method. The objects of the invention are achieved by a method of the independent claim 1.

According to another aspect of the present invention, there is provided the apparatus of claim 9.

The preferred embodiments of the invention are disclosed in the dependent claims.

The invention provides advantages. Images where the target has been variously moved may be combined in order to improve resolution, signal-to-noise ratio and/or dynamic range.

LIST OF THE DRAWINGS

In the following the invention will be described in greater detail by means of preferred embodiments with reference to the attached drawings, in which FIG. 1 illustrates an example of source images;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in these Figures may refer to logical or physical connections. Interfaces between the various elements may be implemented with suitable interface technologies. It is apparent to a person skilled in the art that the described apparatuses may also comprise other functions and structures. Therefore, they need not be discussed in more detail here. Although separate single entities have been depicted, different parts may be implemented in one or more physical or logical entities.

Figure 1:
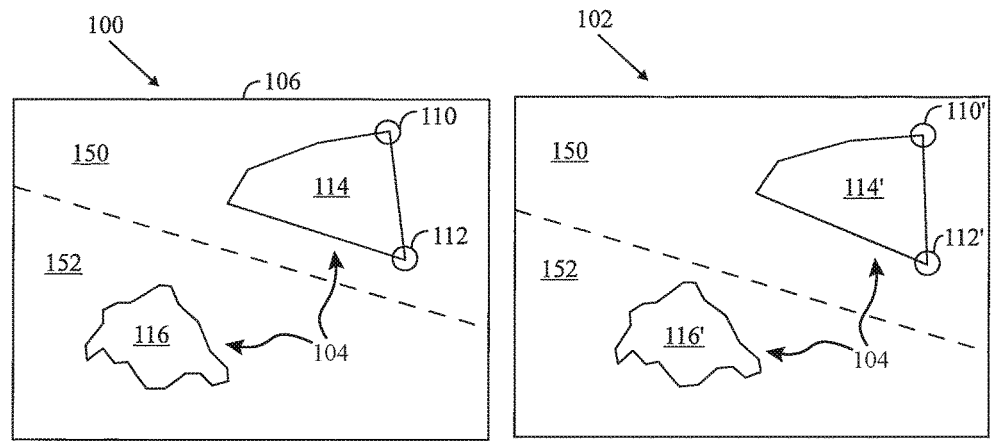

FIG. 1 illustrates an example of source images 100, 102 which are two-dimensional and which are formed of pixel matrices. In general the number of source images is at least two. The images 100, 102 may be captured at difference moments of time. In an embodiment, the images 100, 102 are captured at moments which are not even partially temporally overlapping. The images 100, 102 have the same target 104 which may also be called scene although the target 104 may be captured a little bit differently in different images. The target 104 may comprise at least one object 114, 114', 116, 116' and a background around the at least on object 114, 114', 116, 116' such that the at least one object is distinguished from the background. The reason for the differences in the source images 100, 102 may be caused by a movement of the camera which captures the images or a movement of the at least one object between different capturing moments. The camera may move because a photographer cannot keep his/her hands steady. The objects in the source images may move with respect to the frames of the images because the objects may move with respect to a background and/or the camera. For example, over 50% of the target or scene 104 may be the same in all source images 100, 102.

The movement of the camera, target or the at least one object may be caused by a tilt (rotation in vertical plane), a pan (rotation in horizontal plane), a linear movement horizontally and/or vertically, and/or roll (rotation around the optical axis). Additionally or alternatively the movement may be caused by approaching or retreating or zooming.

One of a plurality of the source images 100, 102 of an imaged target 104 is selected as a reference image 106. The reference image 106 may be any one of the source images 100, 102. The at least one other image 102 then represents the rest of the source images. The reference image 106 may be selected on the basis of a reason. The reason may be that the quality of the image is the best (the image is sharpest, for example). The reason may be that an image formation moment by the detector is the closest to an activation of the shutter (minimum delay between the two). A part of any source image may be deformed in which case the deformed part may not be compensated or corrected.

The movement of the target or scene 104 within the source images 100, 102 with respect to the reference image 106 is detected and measured. The movement may also be considered as a shift or a displacement of the target 104 with respect to the reference image 106. The movement is then measured on the basis of displacement of the target 104 between the reference image 106 and at least one other image 102.

The measured movement between the reference image 106 and at least one other image 102 of the source images 100, 102 is compensated differently in at least two different sections 150, 152 of the at least one other source image 102. The compensation means that the movement or displacement measured in the other images 102 is eliminated by moving a displaced value of a pixel and/or values of groups of pixels to the location where the corresponding value of the pixel or the groups of the pixels are in the reference image 106.

Finally, the reference image 106 and the at least one other image the movement of which is compensated are combined for forming an improved image. Each of the other images 102 in which the movement has been compensated are then shifted on the reference image 106 in the inaccuracy of a pixel and merged together to make an improved single image. The inaccuracy may be in the order of a pixel or less. That is, half a pixel shift may be interpolated, for example.

In an embodiment, the movement may be measured and compensated by an affine transformation model which is known per se. In theory, by having three pixels or points corresponding to each other in the reference image 106 and in another image 102 it is possible to solve an affine model of six parameters. In reality more points may be needed to have accuracy and reliability to the compensation.

The affine transformation model refers to a function between affine spaces which keeps relation of points unchanged and thus preserves straight lines and planes. However, angles between lines or distances between points may be changed which enables the correction of movements between the source images 100, 102.

In an embodiment, the movement may be measured and compensated using a similarity transformation model which is known, per se and which may include translation, scaling and rotation, for example. More generally, the compensation may additionally be able to compensate movements which correspond to homothety and shear mapping, for example.

In an embodiment, the compensation may be performed using a global perspective transformation correction which is known, per se. In general, the movement is compensated by at least two local coordinate transformations which are applied to the sections 150, 152, respectively. The transformations may be similar or different. It may also be so that no transformation is needed or performed.

Figure 2:
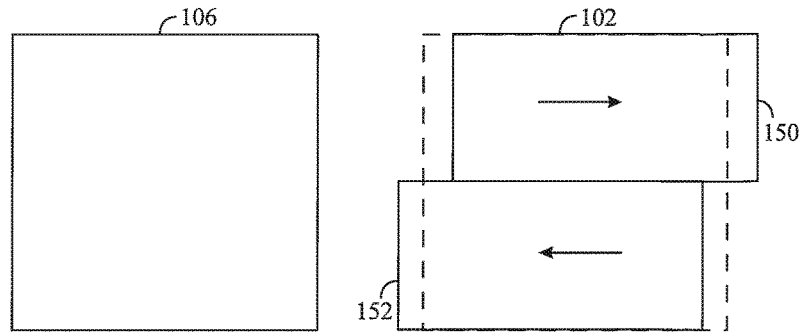
FIG. 2 illustrates an example of a movement in an image with respect to a reference image.

FIG. 2 illustrates an example of the movement in the other image 102 with respect to the reference image 106. In a section 150, the detected movement has been towards the left. Thus, the movement in the section 150 has been compensated by moving the section 150 to the right. The amount of the compensating movement towards the right is the same as the amount of the detected movement to the left. In a section 152, the detected movement has been towards the right. Thus, the movement in the section 152 has been compensated by moving the section 152 to the left. The amount of the compensating movement towards the left is the same as the amount of the detected movement to the right.

In an embodiment, all the other images 102 are compared with the reference image 106 and the movement in each section 150, 152 of the other images 102 is determined image by image.

In an embodiment, the movement may be compensated on the basis of a successive order of recording moments of the sections 150, 152 of the source image 102. The recording moment of section may mean the capturing moment of the section 150, 152.

That the different sections of an image are recorded at different moments may be caused by a rolling shutter of the camera capturing the images. The rolling shutter may be implemented mechanically or electronically. The undesired effects the rolling shutter causes have been very challenging to correct in the prior art. Without correction the undesired effects of the rolling shutter are also a serious problem.

Instead of a snapshot of a still image or a frame of a video of an entire target or scene 104, the image is formed by scanning over the target or scene 104 when using a rolling shutter. Because the scanning takes some time, different sections of the image are recorded at different moments of time. The scanning may be performed line-wise in a similar manner to a method according to which a tv image is formed. The image may be scanned over the target 104 in a vertical direction or horizontal direction, for example. The rolling shutter is used in still image cameras, mobile telephones and many other electric devices capable of capturing photos. It may be that two images match to each other without any movement at upper and lower parts but there is a large displacement in the middle, for example.

In an embodiment, each of the source images 100, 102 may be recorded by scanning over a pixel matrix of a detector of the camera such that each section is recorded at different moment.

The rolling shutters may cause many kinds of movements in different sections of source images 100, 102 such as smear, wobble and/or skew in images, for example. The smear can be seen as an unnatural bending or thickness of a rotating object the speed of which corresponds to that of the rolling shutter. The wobble is caused by camera's vibration in hand(s) or on a stand. The skew is caused by linear movement between the target and the camera.

In an embodiment, common points 110, 110', 112, 112' are searched for in the source images 100, 102 which correspond to each other. The common points 110, 110', 112, 112' may be visibly distinguishable points at different parts of the reference image 106. A common point comprises at least one pixel. The common points may be searched for in the reference image 106 by, for example, Harris edge detection method which is known per se. The common points may be searched for in the other images 102 by correlation of image patches or optical flow method, for example, and by comparing the points with the points detected with the Harris edge method in the corresponding area. Another possibility is to use SIFT (Scale Invariant Feature Transform) or SURF (Speeded Up Robust Features) methods to measure the similarity of the common points. As a result, pairs of point may be formed between the reference image 106 and each of the other images 102.

Figure 3:
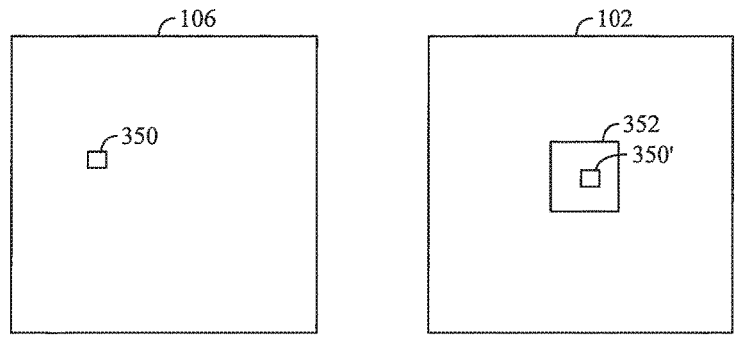
FIG. 3 illustrates an example of a searching method.

FIG. 3 shows an example of the searching method. An area 350 of N×N pixels is selected in the reference image 106 and an area 352 of M×M pixels is selected in the corresponding area 350' of one of the other images 102, where N and M are positive integers larger than two and M is larger than N. In an embodiment, N may be nine, for example. Then an area similar to the area 350 is searched for in the area 352. The search may mean comparisons of N×N pixels of the area 352 with the area 350. The N×N pixels of the area 352 which have the highest similarity with the area 350 is determined to be a corresponding area. In an embodiment, the comparison may compare intensity distributions among the pixels in the areas 350, 352.

Figure 4:
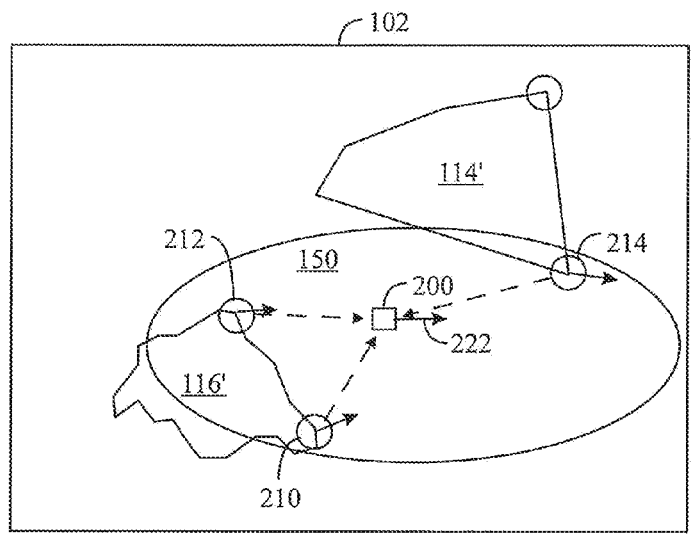
FIG. 4 illustrates an example of movement of a pixel in a section of other image.

In an embodiment illustrated in FIG. 4, a movement of a pixel 200 in a section 150 of a source image 102 of the at least one other image 102 may be estimated by weighting each movement vector of the pixel 200 on the basis of a distance from the common points 210, 212, 214 in the section 150 and the recording moment of the section 150. The weight may be the smaller the longer the distance. In a similar manner the weight may be the smaller the longer the temporal difference between the recordings of the pixel 200 and the common point 210, 212, 214. Mathematically the weight $W_{i,j}$ can be considered to be a function of distance D and recording dependent variable $G_{i,j}$, $W_{i,j}=f(D_{i,j}, G_{i,j})$, where f is a function, i and j are indices which refer to a position of a pixel in the image.

For example, the points or pixels in the upper left corner have more weight in determination of movement in upper left corner than the pixels in the lower right corner. The movement of the pixel may be represented by the vector 222.

In an embodiment, a reliability of the common points 210, 212, 214 may be estimated by determining a similarity between the points in different source images 102. Each similarity is thus determined between the reference image 106 and one of the other images 102.

In an embodiment, the reliability of the common points 110, 110', 112, 112', 210, 212, 214 may be estimated by determining a movement of each of the common points 110, 110', 112, 112', 210, 212, 214 in a direction from the reference image 106 to an image of the at least one other images 102 and in an opposite direction from the image of the at least one other images 102 to the reference image 106. All such common points 110, 110', 112, 112' may be accepted for which the determined opposite movements correspond to each other within a threshold range. The common points or their community may be rejected if the determined opposite movements deviate from each other more than the threshold range. The threshold range may be predetermined.

Figure 5:
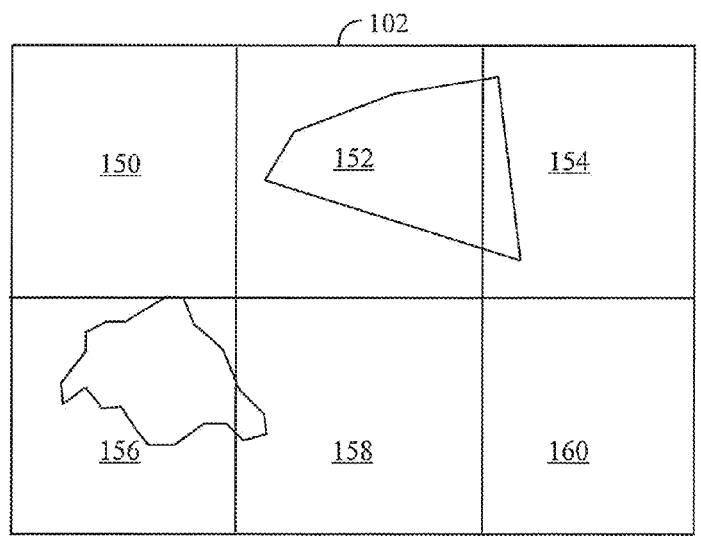
FIG. 5 illustrates an example where an image is divided in a plurality of sections.

In an embodiment which is illustrated in FIG. 5, each of the other images 102 may be divided in a plurality of sections 150, 152, 154, 156, 158, 160. A movement for pixels in each section 150 to 160 may be determined by a weighted least square algorithm or an iterative M-estimator of the movements of the pixels within the same section of a source image 102. For example, the weighted least square movement $L_j$ in each section j may mathematically be expressed as:

$$L_j = \text{argmin}_\beta \Sigma_{i=1}^K W_{i,j} |Y_i - f_i(\beta)|^2$$

where i is a summation index (measurement point or pixel, 210, 212, 214 for example), K is the number of the movements, j is the section or block (for example 152, 154), $W_{i,j}$ is a weight defining how much the measurement (movement vector 210, 212) has effect on the movement of the section/block, $Y_i$ is a point or a pixel with index i, β refers to movement parameters (values of projective matrix in section j) and $f_i(\beta)$ is a function which depends on the iteration round and which defines a new position for a point or pixel. The measurement points with indices i may be in one or more sections, i.e. in the same section or in different sections, such that the distance of a measured point from a section has an effect on the weights. The function $f_i(\beta)$ may be an Andrew function. Using the movement parameters the points 210, 212 may be moved to a new position ($f_i(\beta)$). The movement may be considered as a vector which has a magnitude and a direction. That is, the value of a pixel has to be moved to a determined direction by the distance determined by the magnitude. In an ideal case, the new positions are the same as the corresponding positions in the reference image. But because such full matching of positions is not possible in general (K is higher than the number of movement parameters), the squared sum is minimized and weighted with a weight $W_{i,j}$. In an embodiment, the weight $W_{i,j}$ may depend on the iteration round, particularly if an iterative M-estimator is used.

When using the M-estimator, the weights first come from the distance only which includes the rolling shutter effect. After the first iteration, the weight of the points may be changed such that weights of the farthest points are decreased by taking account of the distance of the whole set of points. Thus, the weight of measurement i at a point j depends also on the movement model computed in the previous iteration round R. This lowers the weight of the outlining points with respect to other points which improves the correctness of the result.

Figure 6:
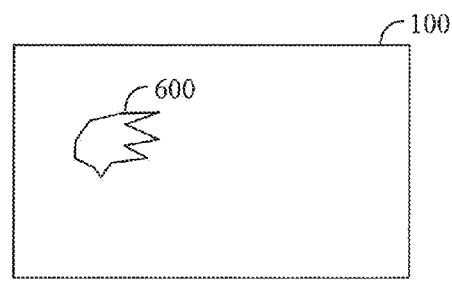
FIG. 6 illustrates an example of a random movement area.

In an embodiment which is illustrated in FIG. 6, a random movement area 600 in the source images 100, 102 is searched for. The random movement may be caused by branches and leaves of trees or flags which are ripped by the wind, for example. In the random movement area 600 a distribution of intensities of pixels is random and a variation of the distribution is above a preset threshold. In an embodiment, the random movement is estimated by comparing at least two source images with each other. The comparison may be based on intensity values of the corresponding pixels or the colour channels used to form the image. Noise may be reduced by combining images but if images with a random movement are combined ghost figures tend to appear in the combined image.

In an embodiment, the random movement area 600 may be inserted from only the reference image 106 to the improved image, if the random movement area 600 is found. In this manner, the unnecessary attempt to improve an area which cannot be improved is avoided and the image in this part remains as it is.

In an embodiment, the source images may be reduced in size by lowering the information content of the images. Then the images of reduced size may then be compared with each other for finding the random movement areas 600. The images of reduced size are faster to compare than the images of original size.

Figure 7:
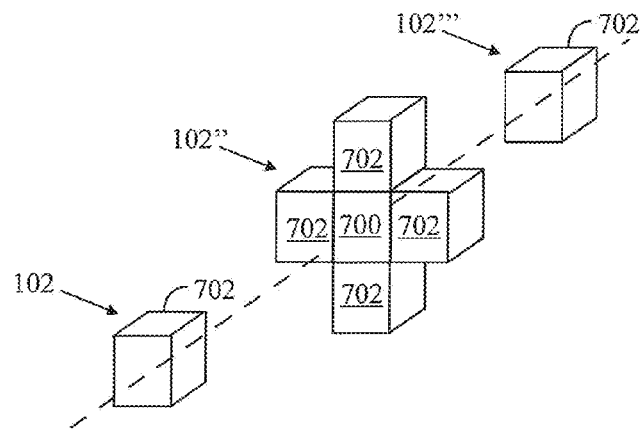
FIG. 7 illustrates an example of neighbouring pixels which surround a pixel three-dimensionally.

In an embodiment which is illustrated in FIG. 7, an intensity of a pixel of the improved image is formed on the basis of intensities of neighbouring pixels which surround said pixel three-dimensionally in the reference image 106 and in the at least one other image 102, 102', 102''. The computation of the intensity of each pixel of the improved image may be performed using a dimensionally modified bilateral filtering. The original bilateral filtering only utilizes neighbouring pixels which are two-dimensionally around a pixel for which an intensity value is computed but the bilateral filtering may be extended to include also the pixels which are neighbours of the pixel in three dimensions.

The modified bilateral filtering may be used to reduce noise from images in a non-linear manner such that edges are preserved. An intensity value of a pixel may be replaced by a weighted average of intensity values of the nearby pixels of said pixel. This weight may have a Gaussian distribution over the distance between the pixels, for example. The weights depend on both the distance between the pixels and the difference in intensity.

In an embodiment, intensity of a pixel is or intensities of a group of pixels may be based on distances and intensities from the neighbouring pixels in the modified bilateral filtering. The neighbouring pixels which may be used to filter the intensity value of a pixel of the improved image are a preset and known set of three-dimensional neighbouring pixels of said pixel. In mathematical form the intensity I(x) of the pixel x may expressed as:

$$I(x) = \frac{1}{w_p} \sum_{j=1}^{K} \sum_{x_{ij} \in \Omega} I(x_{i,j}) f_2(\|I(x_{ij}) - I(x)\|) g_s(\|x_i - x\|)$$

where $\Omega$ refers to neighbourhood, x is the pixel for which the intensity is computed by the filtering, $x_{ij}$ is the pixel in the neighbourhood, $f_2$ refers to a distance between the pixels $x_{ij}$ and x which may be a function of the distance, and $g_s$ is a function which compares the similarity of the pixels $x_{ij}$ and x.

In an embodiment, an intensity of a pixel or intensities of a group of pixels may be based on a local structure or shape in the image. In an embodiment, an intensity of a pixel or intensities of a group of pixels may be based on similarities in shape or distribution in pixel values. In an embodiment, an intensity of a pixel or intensities of a group of pixels may be based on similarities of local pixel structures in the reference image and at least one other image. In this manner, instead of the distance as such a derived value may be used. When the distance is large, the value of $f_2$ may be small or it may be zero. The value of $f_2$ may be large, for example 1, when the distance is short. In this equation, the at least one movement causing differences in the source images may have already been compensated.

This manner of processing reduces blurring at the edges. If the reference image has a bright value, I(1,x)=250 for example, and second source image has a dark value, I(2,x)=50 for example, averaging would result in value (250+50)/2=150. However, the equation gives a small value ($g_s(200)$ is small) for the second source image if the distance is large and thus the value remains at least almost unchanged about 250 (i.e. the pixel remains bright). On the other hand, if the value in the second image is at least almost the same as in the reference image and the distance is short (for example I(2,x)=240=>$g_s(10)\approx 1$), the weights for the second image and the reference image are about the same i.e. about 1. In such a case, the equation averages values which results in elimination of noise.

Figure 8:
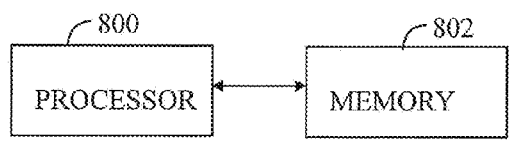
FIG. 8 illustrates an example of at least on processor and at least one memory.

An example of the apparatus is illustrated in FIG. 8. In an embodiment the apparatus may comprise one or more processors 800 and one or more memories 802 which includes a computer program code. The one or more memories 802 and the computer program code cause with the one or more processors 800 the apparatus at least to perform the selection of the reference image 106, the detection and measurement of movement in the at least one source image 102 with respect to the reference image 106. The one or more memories 802 and the computer program code cause with the one or more processors 800 the apparatus at least to compensate of the measured movement in the other images 102 of the source images and combine of the at least one movement compensated image and the reference image 106.

Figure 9:
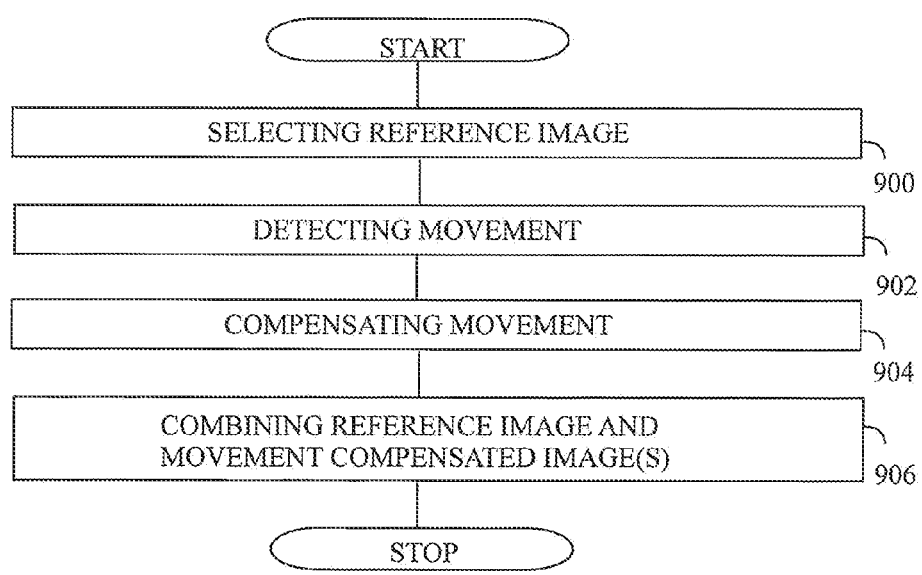
FIG. 9 illustrates an example of a flow chart of a method.

FIG. 9 illustrates an example of the method. In step 900, one of a plurality of two-dimensional pixel matrix source images 100, 102 of an imaged target 104 is selected as a reference image 106. In step 902, movement of the target 104 in the source images 100, 102 is detected. The detection may be performed on the basis of displacement of the target 104 between the reference image 106 and at least one other image 102. In step 904, the detected movement between the reference image 106 and at least one other image 102 of the source images 100, 102 is compensated differently in at least two different sections 150, 152 of the at least one other source image 102. In step 906 the reference image 106 and the movement compensated at least one other image are combined for forming an improved image.

The method may be realized by at least one logic circuit solution or computer program. The at least one computer program may be placed on a computer program distribution means for the distribution thereof. The computer program distribution means is readable by at least one data processing device for encoding the computer program commands and carrying out the actions.

The distribution medium, in turn, may be a medium readable by a data processing device, a program storage medium, a memory readable by a data processing device, a software distribution package readable by a data processing device, a signal readable by a data processing device, a telecommunications signal readable by a data processing device, or a compressed software package readable by a data processing device.

It will be obvious to a person skilled in the art that, as the technology advances, the inventive concept can be implemented in various ways. The invention and its embodiments are not limited to the examples described above but may vary within the scope of the claims.

The invention claimed is:

1. An image processing method for improving image quality, the method comprising:
   selecting one of a plurality of two-dimensional pixel matrix source images of an imaged target as a reference image;
   searching for common points in the source images which correspond to each other;
   detecting movement of the imaged target in the source images by forming a movement estimate for a pixel in a section of at least one source image by weighting a movement vector of the pixel on a basis of a distance from the common points in the section and a recoding moment of the section;
   compensating the detected movement between the reference image and the at least one source image differently in at least two different sections of the at least one source image on a basis of an order of recording moments of the at least two different sections; and
   combining the reference image and the detected movement compensated at least one source image for forming an improved image.

2. The method as claimed in claim 1, further comprising: estimating a reliability of the common points by determining a similarity between the common points in different source images.

3. The method as claimed in claim 1, further comprising:
   estimating a reliability of the common points by determining a movement of each of the common points in a direction from the reference image to an image of the at least one source image and in an opposite direction from the image of the at least one source image to the reference image, and
   accepting the common points if the determined movements correspond to each other within a threshold range, and rejecting the common points if the determined movements deviate from each other more than the threshold range.

4. The method as claimed in claim 1, further comprising:
estimating movements for pixels in the at least two different sections by a weighted least square algorithm or an iterative M-estimator.

5. The method as claimed in claim 1, further comprising:
searching for a random movement area in the source images where a distribution of intensities of pixels is random and a variation of the distribution is above a preset threshold; and setting the random movement area from only the reference image to the improved image, if the random movement area is found.

6. The method as claimed in claim 1, further comprising:
recording each of the source images by scanning over a pixel matrix of a detector such that each section is recorded at a different moment.

7. The method as claimed in claim 1, further comprising:
forming an intensity of a pixel of the improved image on a basis of intensities of neighbouring pixels which surround the pixel three-dimensionally in the reference image and in the at least one source image.

8. The method as claimed in claim 7, wherein an intensity of a pixel is or intensities of a group of pixels are based on similarities of local pixel structures in the at least one source image.

9. An apparatus for improving quality of an image, the apparatus comprising at least one processor programmed to:
select one of a plurality of two-dimensional pixel matrix source images of an imaged target as a reference image;
search for common points in the source images which correspond to each other;
detect movement of the imaged target in the source images by forming a movement estimate for a pixel in a section of at least one source image by weighting a movement vector of the pixel on a basis of a distance from the common points in the section and a recoding moment of the section;
compensate the detected movement between the reference image and the at least one source image differently in at least two different sections of the at least one source image on a basis of an order of recording moments of the at least two different sections; and
combine the reference image and the detected movement compensated at least one source image for forming an improved image.

10. The apparatus as claimed in claim 9, further comprising:
one or more memories including computer program code; wherein
the one or more memories and the computer program code being configured to, with the at least one processor, cause the apparatus at least to perform the selection of the reference image, the detection of movement, the compensation of the detected movement and the combination of the reference image and the at least one source image.

* * * * *